April 24, 1956 — R. W. WIRTZ — 2,742,831
PHOTOCOMPOSING UNIT
Filed Nov. 3, 1952 — 3 Sheets-Sheet 1

INVENTOR.
Robert W. Wirtz
BY Kegan and Kipnis
Attys

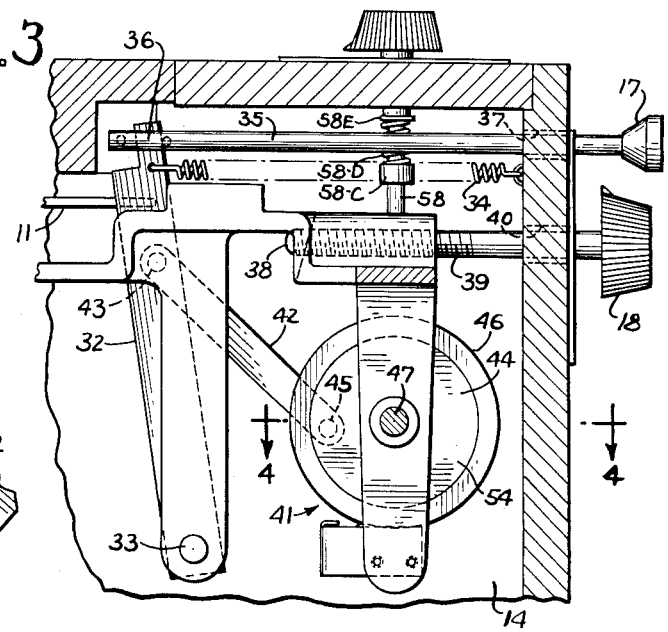
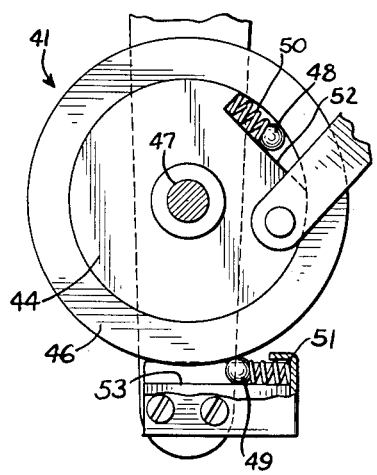
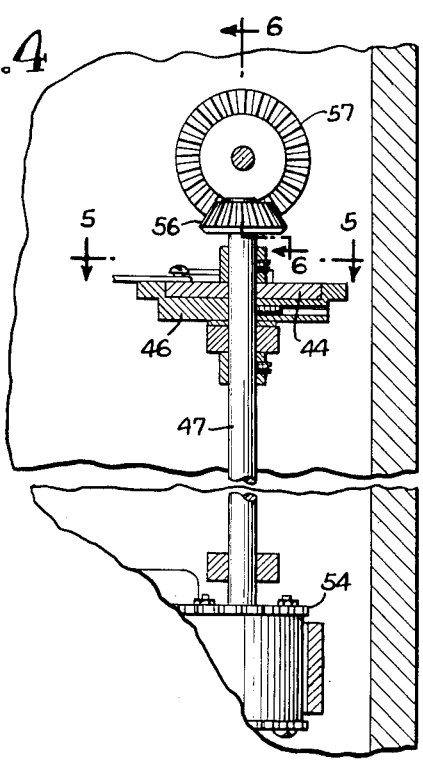
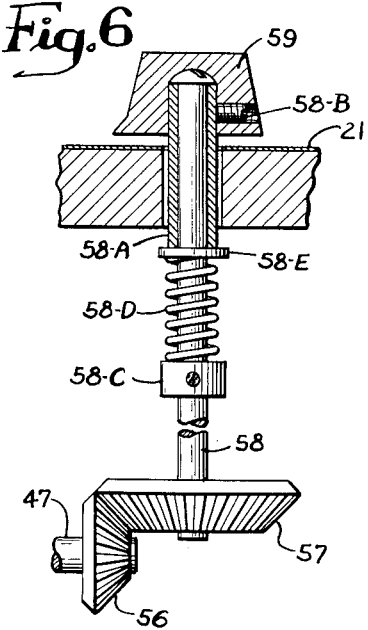

April 24, 1956 R. W. WIRTZ 2,742,831
PHOTOCOMPOSING UNIT
Filed Nov. 3, 1952 3 Sheets-Sheet 3
Fig. 7
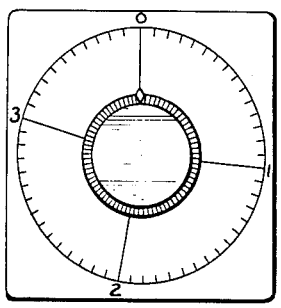
Fig. 8
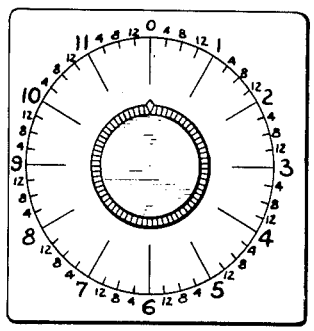
Fig. 9
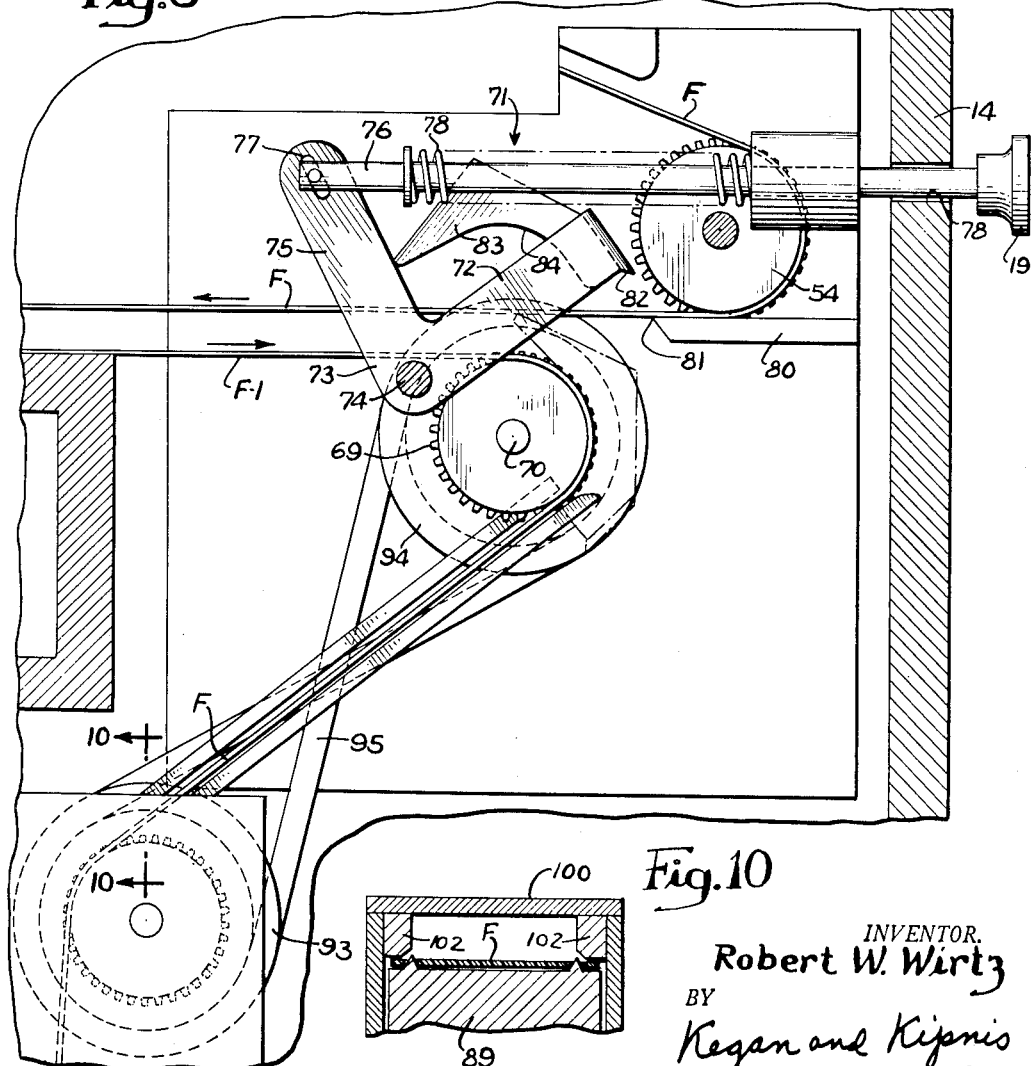
Fig. 10
INVENTOR.
Robert W. Wirtz
BY
Kegan and Kipnis
Attys.

United States Patent Office 2,742,831
Patented Apr. 24, 1956

2,742,831

PHOTOCOMPOSING UNIT

Robert W. Wirtz, Peoria, Ill., assignor to Wirtz Company, Peoria, Ill., a copartnership Application November 3, 1952, Serial No. 318,353

6 Claims. (Cl. 95—4.5)

This invention relates to a photocomposing unit for use in printing establishments of various sizes.

A primary object of the unit is to provide high accuracy in the formation and spacing of photocomposed types. The new unit is practically immune against accidental errors due to over-stretching of film, vibration of the type matrix, or the like.

Another important object is to provide a self-contained unit which not only composes but also transfers and develops typographical matter on film, and delivers film ready for printing use, without need for manual film manipulation, by the mere operation of manipulating and control means on the unit. Such manipulating and control means are so disposed on the unit as to facilitate rapid operation and continuous inspection. The film transfer and processing means are arranged in a new manner, facilitating the manual operation and allowing the rapid completion of film portions, either long or short.

Important features of the new unit, aiding in the achievement of these objectives, can be outlined as follows: A flat matrix disk, also serving as a spacing cam, is inserted in an upper part of the apparatus, in operative relationship with a vertical shaft and a control knob for the same. A photocomposing film exposure station is provided at a peripheral point of the matrix. Film is longitudinally traversed through this station, step-wise, for intermittent exposure and transfer. This primary transfer of the film and the accurate positioning thereof is effected by sprocket clutch means, controlled by a feeler arm cooperating with the cam elements of the matrix. This feeler arm operation also provides accurate positioning of the matrix. The arrangement is such that the mechanism is safe from disturbance by vibration and the like. The unit further comprises a secondary, motor-driven film transfer mechanism, whereby the exposed film with latent photocomposition thereon, can be transferred to and through a developer, within the photocomposing box, when a headline or similar type material has been composed in the exposure station; but only pursuant to suitable, manual cutting off of the film portion containing such type material; the cutting off being effected by one of the manual handles conveniently arranged on the front of the unit. The transfer sprocket cooperates with a series of sprockets in the developer; and the secondary transfer of the film, through and over these different sprockets, is effected in a particularly economical and efficient manner.

The details will be more fully understood upon a study of the description of a preferred embodiment, which follows, and of the drawing appended hereto, wherein a specific form of the invention is disclosed. It must be understood that this disclosure is illustrative only, and that my invention is capable of other forms of embodiments. The invention is an improvement over that disclosed in my co-pending application Serial No. 198,596, filed December 1, 1950, now Patent No. 2,649,036, and is in certain respects, a continuation-in-part thereof.

In the drawing:

Figure 3 is an enlarged detail from Figure 2;

Figure 4 is a sectional fragmentary plan view taken along lines 4—4 in Figure 3;

Figure 5 is a fragmentary elevation taken along lines 5—5 of Figure 4;

Figure 6 is a fragmmentary sectional elevation taken along lines 6—6 of Figure 4;

Figure 7 is a fragmentary elevation taken along lines 7—7 of Figure 1;

Figure 8 is a fragmentary detail from Figure 1;

Figure 9 is a further detail view in elevation taken from Figure 2;

Figure 10 is a sectional view taken along lines 10—10 in Figure 9; and

Figures 1, 2, 11:
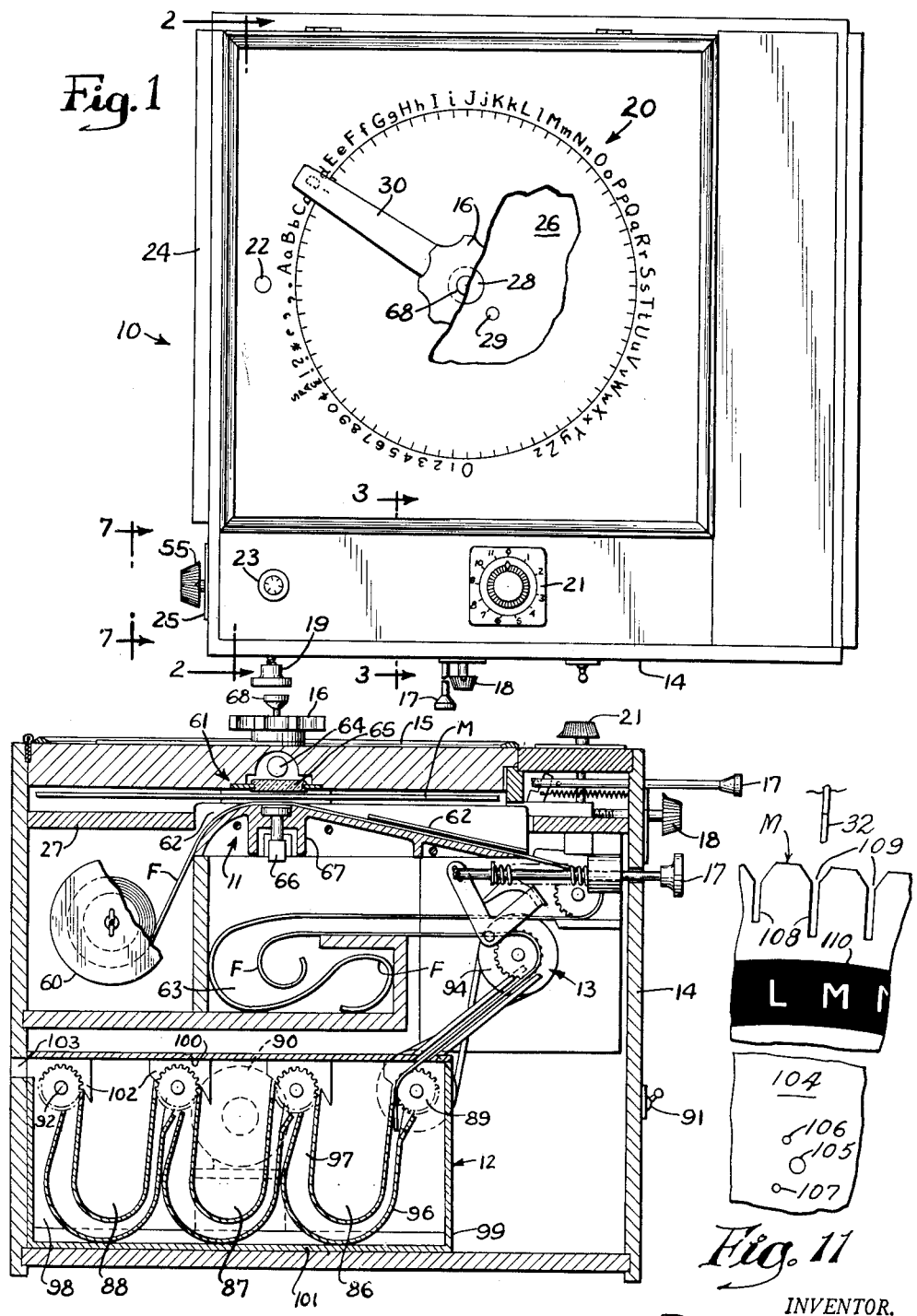
Figure 1 is a plan view of a preferred embodiment of this invention.
Figure 2 is a sectional elevation taken upon the line 2—2 in Figure 1.
Figure 11 is a fragmentary plan view of portions of the matrix and cooperable feeler arm for controlling film feed and effecting accurate matrix positioning.

The entire photocomposing and film processing unit is contained in a substantially rectangular casing 10. The upper part of the casing contains a photocomposing matrix M and a mechanism 11 to expose sensitized film or paper F (hereinafter called film) to predetermined types on the matrix. The lower part of the casing contains a continuous developer unit 12. The intermediate part of the casing contains mechanism 13 to transfer film F tangentially of the matrix M from the exposing station 11 to the developer 12 and incident thereto to cut, guide and otherwise to handle the film.

In the front 14 and top 15 of the casing I provide manually operable controls for the three mechanisms 11, 12 13; particularly a knob 16 to turn the matrix 11; a pusher handle 17 to position the matrix more accurately and also to move and position the film in the exposure station; an adjustment knob 18 for kerning adjustments and the like; and a handle 19 to actuate the film processing mechanism.

The operator will normally have and keep his right hand at the matrix turning knob 16 which is installed on the top plate 15. He will then use his left hand for the operation of the control devices 17, 18 or 19. None of these devices 16 to 19 must be operated at the same time with any of the other devices of the same group.

The mechanism is so arranged that the operator, sitting or standing in front of the box, can keep the controls in easy manual reach, for the different manual operations. Further it is so arranged that he can easily keep important visual indicators in sight; mainly a matrix position indicating dial 20 incorporated in the top part 15 concentrically with the knob 16, a film position indicating dial 21 also incorporated in said top part, and a pair of pilot lights 22 and 23 which are likewise incorporated in the top plate. These four indicating elements 20 to 23 inclusive require more or less constant attention. It will be seen that their inspection is facilitated by the arrangement of the different controls as described. It will be shown particularly that the mechanical arrangement inside the box facilitates positioning the control handles 17, 18 and 19 in that part of the front wall 14 which normally is to the left of the user.

Alternately, the user may prefer to arrange this wall 14 to his right, thereby making the adjoining wall 24 the alternate front. In this case the user will preferably manipulate the matrix control handle 16 with his left hand, and the other handles 17, 18 or 19 with his right hand, in order to allow ready observation of the indicators 20 to 23. The film indicator 21 is in this case somewhat remote from the user; however an alternate film indicator 25 is provided on the alternate front wall 24, providing most convenient indication of the film position. One of the two film indicators 21 or 25 can be used as a relatively rough indicator for general orientation, while the other can be used as a fine or Vernier indicator.

The matrix M is rotatably supported in the upper part of the casing 10 by means of a bearing 26 supported by a horizontal partition 27 in the casing. A central vertical shaft of a horizontal disk 28 is journaled in the bearing 26, and the disk 28 has upwardly projecting pins 29, adapted to fit into matching holes in the matrix M when the matrix is centered and supported on the disk 28.

These pins 29 are also engaged by an upper disk (not shown) coaxially secured to the matrix controlling knob 16 in the casing 10 and suitably journaled in the top plate 15, so that the knob 16, the disk 26 and the matrix M will rotate together. A pointer 30, secured to the knob 16 and playing over the dial 20, facilitates orientation of the knob and matrix and the different types, etc., relative to the exposure station 11. The arrangement is such that when the pointer 30 is rotated into registry with some indicia such as the letter "A" on the scale 20 the corresponding letter "A" on the matrix M is directly above the center 31 of the exposure station 11.

The matrix M is preferably transparent and provided with an opaque peripheral ring wherein the types or other indicia to be copied are formed with substantially peripherally oriented base lines, as known from my above-mentioned patent. The matrix also incorporates, in its peripheral part, a series of radial slots or notches or other abutment means, preferably with beveled spacing portions therebetween for guiding a radially reciprocable feeler member into each slot; the different slots being of different depths, depending upon the desired spacing of the finished letters or other indicia.

Figure 11 shows fragmentary portions of a typical matrix M made in the form of a generally circular, flat sheet or disc 104 of rigid material such as transparent plastic. The center portion of the disc is provided with a spindle hole 105 and eccentrically positioned holes 106, 107, for receiving pins 29, as described hereinbefore. The generally outermost annular part of disc 104 serves as the film spacing and matrix accurate positioning controls. Variable depth radial slots 108 are provided about the periphery of the disc for controlling film feed. Each slot communicates with the disc edge through sloping sides which form a flared mouth 109. An opaque ring 110 is provided intermediate the disc center and outer portions. Light transmitting faces of the characters desired for photographing are spaced around ring 110.

When a slot 108 is accurately positioned before feeler arm 32, movement of the arm radially inwardly allows it to immediately enter the slot. On the other hand, if the initial positioning of the disc leaves the radial slot and arm out of alignment, movement of the arm causes it to strike the related flared mouth 109, exerting pressure thereon. Linear disc movement is resisted by the disc mounting means. At the same time, however, the engaged side acts as a cam which, under pressure from feeler arm 32, causes disc rotation until the arm 32 enters the corresponding slot 108, thereby effecting accurate disc positioning.

The feeler is most simply provided by a flat bar 32 disposed in a vertical plane as shown in Figure 3. This bar is pivoted for limited rocking movement in said vertical plane, over a small, acute angle, by a journal 33 suitably installed below the horizontal plane of the matrix M. Normally the bar 32 is withdrawn from the matrix by one or several springs 34 anchored to the inside of the front wall 14. Against the tension of this spring means, the bar 32 can be moved toward the matrix and into a suitable slot therein, by horizontal, linear motion of a horizontal pusher bar 35 extending through the front wall 14 into the casing 10 and suitably jointed to a top part of the bar 32 as shown at 36. The pusher head or handle 37, 17 is secured to this bar 35 on the outside of the box; the bar extending through a suitable opening 37.

The spring 34 withdraws the bar until the edge of the bar, adjacent the front wall 14, is stopped by an adjustable abutment 38, provided by a set screw 39 suitably installed in the casing, extending through an opening 40 and rotated by the knob 18 outside the casing. Thus the rocking motion of the bar 32 is limited by the position of the knob 18 on the one hand and by the depth of the different slots in the matrix M on the other hand. In this manner accurate letter spacing is integrally provided by the letter matrix itself, subject to special adjustment for kerning purposes and the like by the knob 18.

The so controlled rocking motion of the bar 32 is transmitted to a stepless clutch 41 by a link 42 swingable in a vertical plane; the top end of the link being pivoted to the bar 32 by a pin 43 at some suitable point adjacent the top of the bar, and the bottom end of the link being pivoted to the driving disk 44 of the clutch 41 by a pin 45. The angularity of the motion of the pin 45 is approximately proportional with the length of the stroke of the pin 43, due to the fact that the arrangement is such as to cause only a very minor angular motion of the link 42. By virtue of this fact, any deviation from direct proportionality is minor, as compared with the deviations caused by the step-type clutches, or pawls and ratchet means previously used at this place. Those mechanisms were subject to the same deviation, plus deviations due to the distance between ratchet teeth. The latter distance could not be decreased at will, due to inherent limitations as to pitch and load-carrying capacity of a ratchet. The new, stepless clutch 41 provides said improved, more proportional response by the feature that the pin 45 is arranged for angular reciprocation over a short arc which is spaced by a substantial distance from the pin 43, and the chord of which is directed toward the pin 43.

The entire clutch 41 is installed in a vertical plane and its driven disk 46 is secured to a horizontal shaft 47, suitably journaled in the casing 10 parallel with and adjacent the front wall 14. A one-way clutch transmission member 48 is installed between the driving and driven disks 44, 46, and a similar constructed, anti-return brake 49 is applied to the driven disk 46. Both members 48, 49 are shown as simple bearing balls, spring loaded by compression springs 50, 51 respectively, along flat surfaces 52, 53 formed in the driving disk 44 and the brake member unit comprising the ball 49, respectively. This construction is known as such but is believed to be applied in a novel and advantageous manner in accordance with this invention. So far as I know it has not previously been applied in this manner. The possibility and desirability of using this arrangement was discovered only after considerable work with other mechanical elements.

The clutch-controlled shaft 47 has a film feed sprocket 54 secured thereto adjacent the vertical walls 14, 24. The shaft 47 continues beyond the sprocket 54 and through said wall, where it is provided with an indicating and operating knob 55 cooperating with the aforementioned film indicator dial 25. The shaft 47 is also continued at its other end beyond the clutch 41, where it carries a bevel gear 56 in mesh with another bevel gear 57, the latter gear being secured to a vertical shaft 58 which rotates—preferably indirectly, as will be shown hereinafter—an indicating and operating knob 59 cooperating with the aforementioned second film indicator dial 21. Thus the various positions of the driven clutch disk 46 and film sprocket 54 are indicated on the two dials 21, 25 by the indicator buttons 59 and/or 55; variations between the speeds of such buttons being available by suitable selection of the gear ratio between the gears 56 and 57.

Preferably the indicator 55, directly and rigidly mounted on the film sprocket shaft 47 without any possibility of back lash, is made relatively large, for fine indication of available letter and line length. The gear 56 can then be formed as a small pinion and gear 57 as a suitably larger gear, for an approximate, more comprehensive indication at 59. On the other hand I prefer mounting the indicator 59 loosely on its shaft 58 so that it can be moved forward and backward regardless of the gears 56, 57, the brake 49, and the friction of the clutch 41, to facilitate rapid, approximate measurements of remaining space in given lines or portions thereof. For this purpose, a sleeve 58A is slidably disposed around the upper part of the shaft 58 and secured to the center part of the knob 59 by a set screw 58B. A collar 58C, secured to a lower part of the shaft 58, retains a compression spring 58D, which applies a slight upward pressure (as compared with the force of spring 34) against the sleeve 58A, through a slidable washer 58E. It will be seen that the parts 58A, B, C, D form a two-way, low pressure clutch for the indicator 59, when the mechanism 41 forms a one-way relatively high-pressured clutch for the primary transfer mechanism, the motion of which is to be indicated.

The entire assembly of the feeler bar 32, its control handle 17, and its overall indicator 59, is conveniently disposed in a middle portion of the cabinet 10 and front wall 14, as will be evident from an inspection of Figure 1.

The sprocket 54 pulls the film F from a magazine or supply reel 60 through a fairly short and suitably streamlined passage or channel 61 including the exposure station 11, minimizing the resistance to film travel and resulting stretch of film, or shifting between film and sprocket teeth. The sprocket also propels the exposed film F further on into a storage space 63 suitably formed within the casing 10.

The exposure station 11 is positioned directly below the pilot unit 22, which in turn is positioned adjacent the side wall 24, at the left side of the letter dial 20. The pilot arrangement 22 may simply consist in an opening through the top plate 15, with an electric bulb 64 suitably installed directly below this opening. Again, below this bulb 64 a transparent or translucent plate 65 is incorporated in the lower surface of the top plate 15. A vertically reciprocable piston 66, normally held in its lowermost position by the force of gravity, is slidably mounted in the exposure station, below the film F by suitable structure 67. Whenever a type or the like shall be transferred from the matrix onto the film, sharp and accurate contact printing is insured by raising the piston 66 so that it presses the film F against the lower surface of the matrix M, which in turn is pressed by this film against the lower surface of the plate 65. This raising of the piston 66 is manually effected by linkage (not shown) actuated by a pusher handle 68. This pusher handle is shown as being installed coaxially with and slightly above the matrix control knob 16 so that an operator can operate this pusher with the thumb of his right hand, while controlling the knob with the other fingers of the same hand. Of course, various modifications are possible in these respects.

A depression of the pusher handle 68 not only raises the piston 66 to insure a contact arrangement, but also actuates a suitable switch (not shown), energizing the bulb 64. The matrix and film and the different manipulating means connected with both are practically immobilized by the contact pressure between the piston 66, film F, matrix M and plate 65, so that even strong vibration, inadvertent operation of any control button or the like, cannot mar the accuracy of the photo-copying process. Accidental shifting of the film between exposures is counteracted by the clutch brake 49.

Pursuant to each exposure, the pusher 68 is released, the matrix knob 16 and pointer 30 are angularly re-set approximately to the next type or other indicia to be printed, and the feeler pusher 17 is then pushed forward as far as allowed by the matrix slot encountered, thus completing the angular adjustment of the matrix by the sloping edges of the slotted portion, and also promoting the film by the required distance, through the clutch 41. The contact printing button 68 can then be depressed again. This entire sequence of operations need not occupy as much as one second, when performed by an operator who has acquired reasonable skill by a few minutes' practice.

Pursuant to the intermittent exposure of a certain number of types or indicia forming a line, for instance a headline to be pasted onto a printing setup with smaller type, it is often desirable and always possible with the present apparatus, to accomplish the complete processing of the exposed film at once, in the box 10. Either one or several lines can be processed. For this the film transfer and processing devices 12 and 13 are provided.

The transfer device 13 comprises mainly a secondary film sprocket 69, positioned in the box 10 slightly below and backwardly of the primary sprocket 54, on a shaft 70. It further comprises a swingable film cutting and guiding device 71 supported by one arm 72 of a bell crank 73 pivoted at 74 for swinging movements across the horizontal plane in which the film leaves the primary sprocket 54. The other arm 75 of the bell crank 73 has a horizontal bar 76 suitably pivoted to one end 77; this bar extending through an opening 78 in the front wall 14 and carrying the aforementioned handle 19 on the outside of the box 10. The bar 76 is biased backwards by a spring 79 and can be pulled forward by the handle 19 against the compression of this spring. The handle 19, when displaced toward the front wall 14 by the spring, serves as an abutment or stop for the released position of the bell crank and film cutting and guiding unit 71. In such released position the cutting and guiding unit 71 is disposed above the horizontal plane of film discharge from sprocket 54. A rigid shelf 80, parallel with said horizontal plane, is disposed directly below the sprocket 54, extending from the inside of the front wall 14 to an area slightly back of the vertical center line of said sprocket, as shown. The free inner end of this shelf desirably forms a knife edge 81. A cooperating knife edge 82 is incorporated in the unit 71. When the handle 19 is pulled forward the bell crank 73 is rocked in a clockwise direction as seen in Figure 9, incident to which the movable knife edge 82 shears the film at the stationary knife edge 81. This shearing should be effected if and when some suitable length of film, containing one or several composed lines, has been displaced past the primary sprocket 54 and into the storage chamber 63.

The cutting and guiding unit 71 also serves to transfer the stored film to the secondary sprocket 69. For this purpose the bell crank arm 72 has rigidly secured to the outer parts thereof a guide block 83 having a suitably curved surface 84 which faces the sprocket 69. It will be seen that this surface 84 starts adjacent the cutting edge 82 and that at least a major part of this surface of the guide block has concave curvature substantially conforming with the convex curvature of the sprocket 69. The angular extent of this concave curvature of the surface 84 corresponds to an appreciable portion of the circumference of the sprocket, for instance as shown, approximately ninety degrees. It will further be seen that the bell crank lever 73 is so disposed that in its released position the guide block 83 is spaced above the sprocket 69 but that forward displacement of the handle 19 and arm 75 causes the arm 72 and block 83 to approach said sprocket, and thus to lower the film F discharged from the primary sprocket into a new position F-1, at the same time wrapping the film F-1 around the front part of the sprocket 69. This sprocket serves to propel the lowered film F-1, through a suitable guide channel 85, into the film developing unit 12.

The developing unit 12 comprises the usual series of containers 86, 87, 88, containing respectively the well known developers or print intensifiers, fixing solutions or the like, and water or other washing agents. The developer 12 also has a series of well-known film transfer sprockets 89 installed in or adjacent the upper parts of the containers 86, etc. and driven by an electrical motor 90 through suitable belts or chains (not shown). The motor 90 can be started and stopped by switch 91 in the front wall 14.

The first film sprocket 89 of the developer 12, in the direction of film travel, is secured to a shaft 92 which also rotates a pulley wheel 93. This in turn rotates a pulley wheel 94 of equal size, secured to the shaft 70 of the secondary film sprocket 69, the pulleys 93 and 94 being interconnected by a belt 95, crossed in the shape of an 8, so that counter-clockwise rotation of the developer sprockets 89 results in clockwise rotation, at equal speed, of the secondary film sprocket 69. All sprockets 54, 69, 89 preferably have the same size, as used in a variety of photographic devices.

The transfer mechanism 13, by means of the guide block 83, channel 85 and cooperating elements, transfers the lowered film F-1 to the upper inner side of the first developer sprocket 89A. From here the film is guided over the second developer sprocket 89B, then over the third 89C and finally out of the developer and practically out of the apparatus over the fourth and last developer sprocket 89D. Three loops are formed, in a film of sufficient length to reach from the first to the fourth developer sprocket; each loop of the film being guided between a lower wall or ribbon 96 and an upper wall or ribbon 97. These walls or ribbons are formed of rigid sheet or plate material suitably formed and installed between side walls 98 of the developer 12. The developer, of course, is also provided with suitable end walls 99, top 100 and bottom 101, so that it can be removed from the casing 10 for replenishment of chemical solutions and the like. The lower ribbons 96 are best secured rigidly to the lower part of the developer formed by the walls 98, 99 and 101, while the upper ribbons 97 are secured to a removable top 100.

It is known that sensitized film or paper can be moved longitudinally over certain lengths of travel by mere pushing forces, so long as the forward or leading end of the strip is suitably guided, provided that the strip is properly protected from being deflected, gathered up, bent, kinked, or otherwise injured by friction with the guiding surfaces. I have found such forward pushing of film possible and quite efficient when a relatively short length of film is involved; for instance a single headline. In other words it is possible but not necessary to have a continuous strip of film reaching from the first to the fourth developer sprocket.

Accordingly, I have made the film channel 85 between the secondary sprocket 69 and the developer 12 only a few inches in length. Likewise, I have made the loops of the film in the developer 12 rather short; approximately as long as a film containing one or two photocomposed headlines. It is possible to secure proper developing, fixing and washing by suitable adjustment of the speed of film feed through the developer, and proper adjustment of the strength of the different solutions. This problem is further simplified by the fact that in photo-typographical work, no half-tones or the like are usually required in the developed film.

I have thus found it possible to eliminate all pulling of the film, as distinguished from pushing thereof. In other words, the sprocket 69 pushes the exposed film through the channel 85, without any help of film, festooned leaders or the like. The first developer sprocket 89A, in turn, pushes the exposed film through the first solution container 86, between the upper and lower ribbons 97, 96 thereof, again without the aid of any preceding film of leader.

In the first or downwardly directed part of the U-shaped channel formed between the ribbons 96 and 97 the film forms substantially an S-shaped curve as seen in Figure 2. It can be shown that substantial pressure is exerted only on the under side of the film, which travels in frictional contact with the lower ribbon 96. For this reason it is desirable to feed the film through the developer with the emulsion side facing upward.

This is achieved by the aforementioned downward transfer of the film F to position F-1 in the transfer unit 13. The film magazine 60 feeds the film F through the exposure station 11 with the emulsion side facing upward for direct contact with the under side of the matrix M. Accordingly, the emulsion side faces downward in the horizontal plane of film discharge from the primary sprocket 54. Pursuant to the downward displacement from F to F-1, the emulsion side still faces downward, in the lower horizontal plane along which the film now moves in reverse direction, toward the secondary sprocket 69. Pursuant to passage of the film around this sprocket, the emulsion faces upward in the channel 85 and in the developer chambers 86, etc. Thus it is only the plain paper side of the film which has frictional engagement with guide walls under substantial pressure, and on that side, frictional engagement is a matter of indifference.

Of course it is necessary to keep the film in contact with each of the developer sprockets. For this purpose some pressure against the emulsion side is required. This pressure, however, is required only adjacent the sprocket teeth, that is, outside the exposed area of the film. Stationary film guide blocks 102 are secured to the under side of the developer top 100, adjacent each sprocket 89, for the purpose of so retaining the edges of the film.

In the embodiment shown, the longitudinal distance from one sprocket 89A to the next sprocket 89B, is slightly greater than the distance from the main transfer sprocket 69 to the first developer sprocket 89A. The minimum length of film which can be handled in the developer unit is determined by this distance 89A, 89B. Whenever a length of film equalling or exceeding this distance has been handled in the exposure station, and promoted past the primary sprocket 54, the automatic transfer and developing process can be effected by pulling out the handle 19 and placing the switch 91 in "on" position. The film section in question will then be promoted from sprocket to sprocket until it is discharged from the developer 12 and box 10 through an outlet opening 103.

It will be understood by persons skilled in the art that a number of modifications can be applied to the apparatus as shown.

I claim:

1. In a photocomposing unit for work with a circular, combined matrix and spacing cam having characters thereon, with base lines peripheral thereof, means to support the matrix and cam and to place it in predetermined positions; a feeler member; a stationary abutment for the feeler member; means to bias the feeler member toward the stationary abutment; means to move the feeler member from the stationary abutment toward the spacing means of the matrix and cam; a stepless one-way clutch having a driving member directly linked to the feeler member; a film transfer wheel rotatable with the driven member of the clutch and adapted to move film tangentially of the cam and through the exposure station when the feeler member is being moved to the spacing means; indicator means adapted to indicate the angular position of the driven member of the clutch and film transfer wheel relative to a pre-determined length of film transfer motions, said indicator means including a first pointer rigidly secured to the film transfer wheel, and a second pointer connected therewith by speed reduction gearing and adapted to be angularly readjusted relative thereto; and means to adjust the position of the stationary abutment to vary the lengths of such film transfer motions.

2. A photocomposing machine including a rigid character-bearing matrix which is moved to position one character at a time for reproduction and which has a plurality of narrow slots for locking said matrix in any one of a plurality of definite positions and beveled portions associated with each slot for guiding a rigid blunt probe thereinto, and positioning mechanism comprising said probe, means movably supporting said matrix and preventing displacement thereof in the direction of movement of said probe, means constraining said probe to reciprocating linear movement along its central axis only, means for pushing said probe forward, and means for approximately positioning said matrix with a beveled portion associated with a preselected one of said slots adjacent said probe, so that pushing said probe against said beveled portion deflects said matrix until said probe penetrates said preselected slot, whereby said matrix is locked precisely in the selected position.

3. In a photocomposing machine which prints on film through a rigid circular matrix having a set of characters and corresponding peripheral slots, the depth of each slot being a function of the width of the corresponding character, each slot having a relatively wide inwardly tapering mouth, the improvement for simultaneously achieving rapid accurate positioning and locking of said matrix, and film feed for each character quantitatively proportioned to its width, which comprises: a blunt rigid probe, means constraining said probe to reciprocating linear motion along its length, a turntable for supporting said matrix with its center of rotation aligned with said probe and its periphery in position to be pushed by said probe, means preventing linear displacement of said matrix, and means which feed said film in direct proportion to the amount of movement in one direction only of said probe, whereby pushing said probe against the inwardly tapering mouth of one of said slots rotates said matrix until said probe penetrates the entire slot, thereby locking said matrix precisely in position and feeding a quantity of film controlled by the depth of the slot.

4. Apparatus as defined in claim 3 wherein the film feeding means includes a friction clutch having a driving member and a driven member, means whereby the amount of movement of said probe controls the extent of movement of said driving member, means whereby said driven member feeds film, and a one-way brake permitting said driven member to move in one direction only.

5. A photocomposing unit for use with a circular disc having an annular array of exposure characters thereon and character spacing means including a plurality of peripheral slots, one for each character and having a depth proportioned to the width thereof, the closed end of each slot constituting a stop, the open end of each slot comprising a relatively wide tapering mouth, comprising: an exposure station, means for supplying film to said station; a rotatable carriage to support the disc for selectively positioning characters at said exposure station; a rigid follower movable from a base position along a line through the axis of rotation of said carriage; means constraining follower movement along said line; yieldable means normally retaining said follower at said base position; means to effect movement of said follower toward the spacing means on said disc; a friction clutch comprising driving and driven members; means whereby follower movement causes angular motion in said driving member directly proportional to the movement of said follower; a film transfer wheel rotatable with said driven member for moving film past said exposure station; and a one-way brake for said driven member to allow rotation thereof only when the follower moves towards said spacing means, whereby pressure by the follower on the tapered mouth surface of any slot causes said disc to rotate until the follower is aligned with the corresponding stop, thereby accurately positioning the character associated with said slot for photographing and simultaneously feeding the correct quantity of film for photographing said character.

6. In a photocomposing machine including a rigid circular disc having an annular array of exposure characters thereon and character spacing means comprising a plurality of radial slots, one for each character and having a depth related to the width requirement thereof, said slots each further being characterized by a relatively wide tapered mouth at the periphery of said disc to receive a rigid follower movable from a base position into any one of said slots: rotatable means to support the disc and selectively position any character thereon at an exposure station, means constraining said follower whereby it moves only along a line comprising a diameter of said disc, means releasably maintaining said follower at said base position; means to move the follower toward the spacing means; a one-way clutch having a driving member linked with the follower; a film transfer wheel rotatable with the driven member of said clutch to move film through the exposure station as the follower moves toward said spacing means, whereby contact by said follower on any mouth surface causes disc rotation until the follower and the radial slot portion whereto the contacted mouth leads are aligned, whereupon said follower enters said radial slot portion and locks said disc accurately in position for exposing that character associated with said slot, the travel by said follower from said base position to the end of said slot causing film feed equal to the width requirements of said character.

References Cited in the file of this patent

UNITED STATES PATENTS

| | | |
|---|---|---|
| 943,614 | Blacklidge | Dec. 14, 1909 |
| 1,259,355 | Bunnell | Mar. 12, 1918 |
| 1,283,394 | Bawtree | Oct. 29, 1918 |
| 1,553,920 | Smothers | Sept. 15, 1925 |
| 1,968,287 | Farina | July 31, 1934 |
| 1,974,353 | Zollinger | Sept. 18, 1934 |
| 2,085,188 | Gerlach | June 29, 1937 |
| 2,203,437 | Levy | June 4, 1940 |
| 2,298,666 | Whitelaw | Oct. 13, 1942 |
| 2,475,497 | Harrold | July 5, 1949 |

FOREIGN PATENTS

| | | |
|---|---|---|
| 174,621 | Great Britain | Apr. 25, 1923 |